United States Patent [19]

Dunkley et al.

[11] Patent Number: 4,752,965
[45] Date of Patent: Jun. 21, 1988

[54] SIGN VERIFICATION

[75] Inventors: Rowland A. Dunkley, Leighton Buzzard; Peter C. Pugsley, Pinner, both of England

[73] Assignee: The De La Rue Company PLC, London, England

[21] Appl. No.: 61,673

[22] Filed: Jun. 15, 1987

Related U.S. Application Data

[63] Continuation of Ser. No. 704,276, Feb. 22, 1985, abandoned.

[30] Foreign Application Priority Data

Feb. 24, 1984 [GB] United Kingdom ................ 8404827

[51] Int. Cl.⁴ .............................................. G06K 9/00
[52] U.S. Cl. ........................................ 382/3; 382/13; 235/379; 235/380; 340/825.33; 340/825.34
[58] Field of Search ................... 178/18, 19, 20; 235/379, 380; 340/825.33, 825.34; 382/3, 13, 59

[56] References Cited

U.S. PATENT DOCUMENTS

| | | | |
|---|---|---|---|
| 3,806,704 | 4/1974 | Shinal | 382/3 |
| 3,812,460 | 5/1974 | Solimans et al. | 382/67 |
| 4,028,674 | 6/1977 | Chuang | 382/3 |
| 4,070,649 | 1/1978 | Wright, Jr. et al. | 382/13 |
| 4,105,156 | 8/1978 | Dethloff | 235/491 |
| 4,139,837 | 2/1979 | Liljenwall et al. | 382/13 |
| 4,202,626 | 5/1980 | Mayer, Jr. et al. | 356/71 |
| 4,262,281 | 4/1981 | Buckle et al. | 382/13 |
| 4,341,951 | 7/1982 | Benton | 235/381 |
| 4,523,087 | 6/1985 | Benton | 235/380 |
| 4,689,478 | 8/1987 | Hale et al. | 235/379 |

FOREIGN PATENT DOCUMENTS

| | | |
|---|---|---|
| 0006419 | 6/1981 | European Pat. Off. . |
| 3113105 | 10/1982 | Fed. Rep. of Germany . |
| 8203485 | 10/1982 | PCT Int'l Appl. . |
| 2080004 | 2/1979 | United Kingdom . |
| 2104698 | 3/1983 | United Kingdom . |

*Primary Examiner*—Leo H. Boudreau
*Assistant Examiner*—Jose L. Couso
*Attorney, Agent, or Firm*—Cushman, Darby & Cushman

[57] ABSTRACT

A self contained writing pad unit (1) comprises a pressure pad (7) for sensing movement of a writing instrument over a contact surface (2) of the unit when a user writes a sign, for example a signature, either directly on the contact surface or on a writing medium (4) supported by the contact surface. Electronics (8) including a RAM and timing systems determine data relating to the original signature. A power supply (9) is provided to enable operation of the electronics (8). The unit (1) is portable and the data represents dynamic characteristic features of the writing signature.

13 Claims, 7 Drawing Sheets

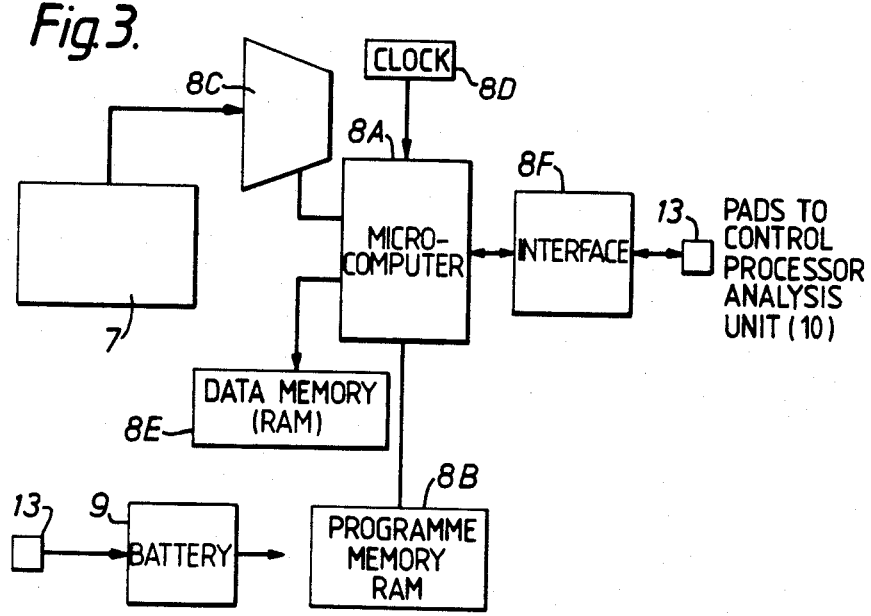
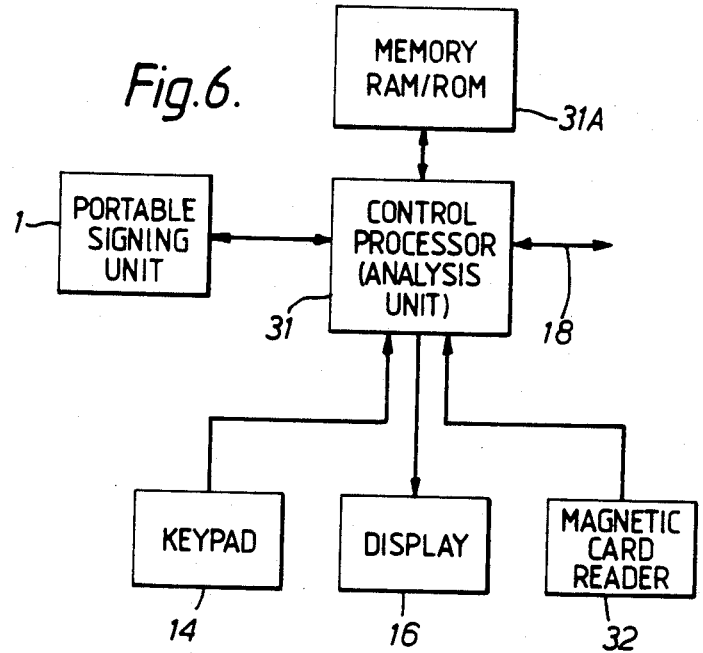

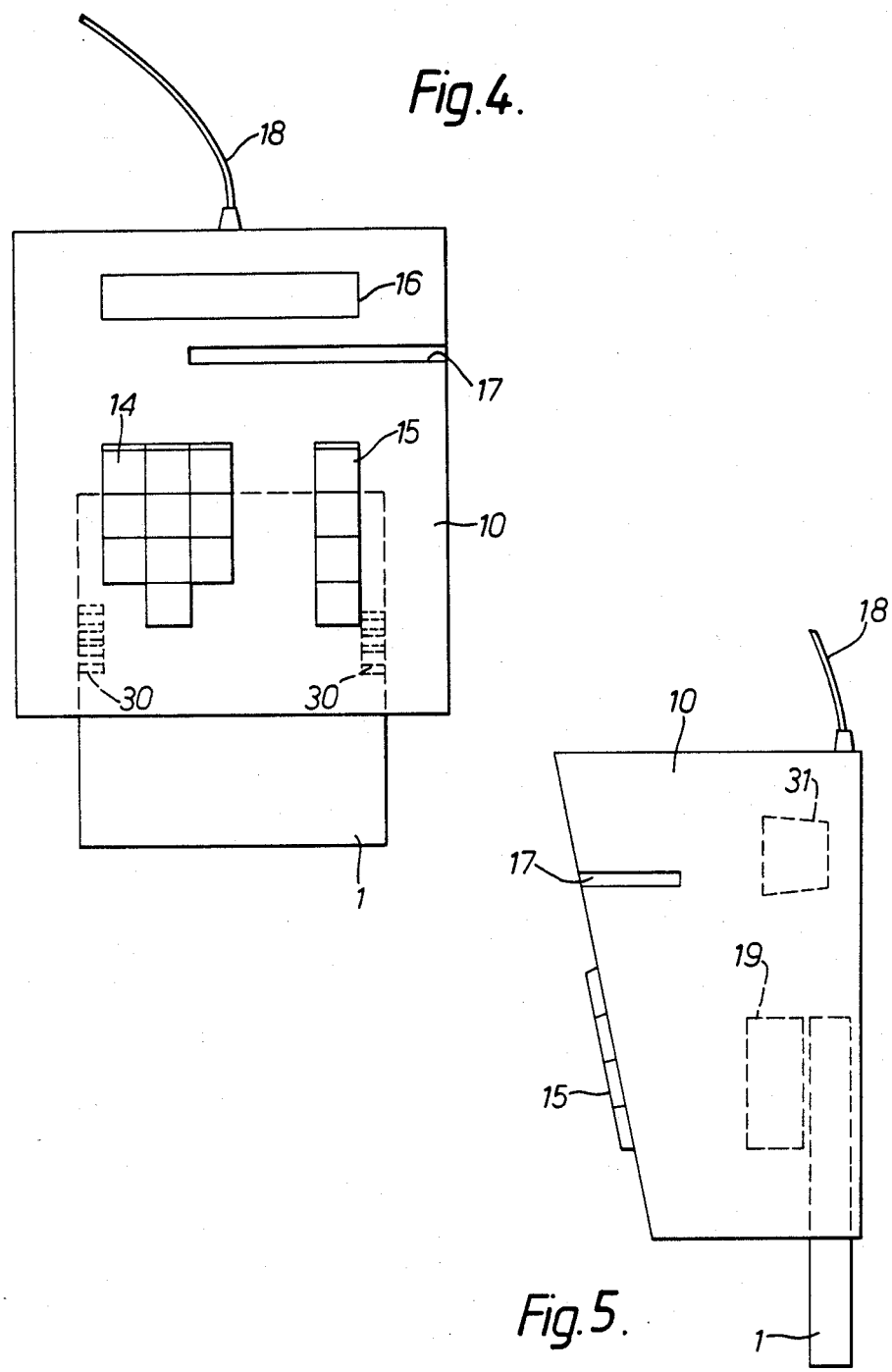

SIGN VERIFICATION

This is a continuation of application Ser. No. 704,276, filed Feb. 22, 1985, which was abandoned upon the filing hereof.

The invention relates to sign verification apparatus particularly for use with credit cards and debit cards where it is necessary to verify the identity of the bearer of the card who will sign a docket in return for sales of goods or services. In addition, sign verification may be used to verify the identity of a person wishing to gain access to a building or other installation.

Various sophisticated methods of sign verification have been developed, some of which are disclosed in our co-pending International Patent Applications Nos. PCT/GB85/00009 and PCT/GB85/00008. Some of these involve determining dynamic and static characteristics of the written sign, which it has been found are difficult to imitate. The apparatus needed to determine these characteristics is complex and this leads to problems in some cases, for example restaurants, where it is preferred to supply a sales docket to the customer at his table.

One attempt at solving this problem is disclosed in U.S. Pat. No. 3,806,704. This specification discloses apparatus for carrying out a simple authenticity test on a signature written on a sales docket placed on the apparatus. The test simply involves determining the number of vertical reversals performed while writing the signature which is compared with a reference number stored on a credit card. The apparatus provides means for reading information from the credit card, means for determining the number of vertical reversals performed while writing the signature, and means for comparing the two. This apparatus suffers from a number of disadvantages, the main ones being the cumbersome nature of the apparatus requiring the signatory to come to the apparatus which is undesirable in the context of restaurants, and secondly the fact that only a simple static characteristic feature is determined (number of vertical reversals).

In accordance with a first aspect of the present invention, a self-contained portable writing pad unit comprises sensing means for sensing movement of a writing instrument over a contact surface of the unit when a user writes a sign either directly on the contact surface or on a writing medium supported by the contact surface; electronic means for determining data relating to the written sign; and a power supply for enabling operation of the electronic means and is characterised in that the data represents at least one characteristic feature of the written sign; in that the electronic means includes storage means for storing the data; and in that the unit is portable.

This writing pad unit may be simple and compact in construction enabling it to be offered to the customer in any convenient position or, in an establishment such as a restaurant, taken to the customer at his table. The unit can be attractively styled and may additionally be provided with a writing instrument rest and generally presented as a convenience to the customer.

Preferably, the data represents at least one dynamic characteristic feature. We have discovered that the determination of dynamic characteristic features of a sign enables accurate sign verification to be achieved. This information can only be obtained while a signatory is writing his signature and the invention, unlike the prior art, allows this to be achieved at the convenience of the user.

Typical dynamic characteristic features which may be determined by the electronic means are the time of writing the complete sign (for example the customer's signature) and the times for which the writing instrument is in contact and out of contact with the contact surface or a writing medium supported by the contact surface. The writing pad may, however, be more complex enabling the electronic means to detect other dynamic characteristics such as location of the writing instrument and degree of pressure.

The sensing means may be provided by a simple pressure pad which provides an indication solely of when a writing instrument is applying pressure to the contact surface or the sensing means may be provided by a conventional X-Y pad which indicates not only when pressure is applied to the contact surface but also the X, Y coordinates of the writing instrument when pressure is applied. In either case, the electronic means may include a clock to enable the pressure indications to be related to time. In the case of an X-Y pad the use of a clock would enable speed and acceleration of the writing instrument to be determined as additional dynamic characteristic features.

One of the important advantages of this writing pad unit is that conventional sales dockets may be used with the unit (unlike the dockets of U.S. Pat. No. 3,806,704). Preferably locating means are provided on the unit to locate the sales docket or other writing medium in a predetermined position relative to the contact surface.

The power supply may comprise a conventional primary battery but is preferably rechargable.

The details recorded by the electronic means may be read and processed in a conventional fashion. Preferably, however, and in accordance with a second aspect of the present invention sign verification apparatus comprises an analysis unit; and a self-contained portable writing pad unit in accordance with the first aspect of the present invention, the writing pad unit being separable from but connectable to the analysis unit, wherein the analysis unit comprises comparison means for comparing the or each characteristic stored by the writing pad unit electronic means with corresponding reference data and for indicating verification if the compared characteristics are substantially the same.

This sign verification apparatus enables additional information to be derived from the written sign, which may have been written directly on the contact surface or on a writing medium supported by the contact surface, thus increasing the chances of detecting fraud.

Conveniently, when the writing pad unit is associated with the analysis unit, they are electrically connected. This enables the, preferably dynamic, characteristic data stored by the writing pad unit electronic means to be easily read by the comparison means and, where appropriate, enables the writing pad unit power supply to be recharged. However, optical or infra-red coupling may also be used for data transfer.

Preferably, the analysis unit comprises static characteristic analysis means for determining, when the writing pad unit is connected to the analysis unit, at least one static characteristic of a sign written on the writing pad unit, the comparison means comparing each static characteristic determined by the static characteristic analysis means with corresponding reference data.

The reference data accessed by the comparison means may be supplied in a variety of ways. For example, the sign verification apparatus may further include a magnetic strip (SWIPE) reader for reading the reference data stored on a credit or other security card. Alternatively, or additionally the sign verification apparatus may be connectable to a remote data base containing the reference data relating to dynamic and static characteristics, the correct portion of the data base being accessed either by reading a suitable code from the magnetic strip of a security card or by supplying a code number provided by the customer. Where the apparatus is connectable to a remote data base, this will require the additional provision of a conventional modem.

The analysis unit may further include a print head, such as a dot matrix print head or a daisywheel, which can imprint transaction data on part of a docket supported on the writing pad unit. This data may be supplied via an input unit such as a key pad comprising numeric and function keys or, where the apparatus forms part of an electronic cash register the information may be supplied directly from the cash register. Conveniently, an alpha numeric display is provided on the sign verification apparatus to indicate for example the transaction status and amount.

In order to print the information on the docket, it is necessary for the print head and docket to be relatively movable and this is most conveniently achieved if the writing pad unit is movable in stepwise fashion relative to the rest of the sign verification apparatus while the print head is movable in a direction transverse to the direction of movement of the pad unit. This has the additional advantage that, when provided, the static characteristic analysis means may scan the written sign during movement of the writing pad unit. Conveniently, the sign verification apparatus further includes drive means which cause movement of a drive surface cooperating with one or more portions of the writing pad unit to cause the writing pad unit to move relatively to the remainder of the apparatus. For example, the cooperating surface and portion(s) may comprise cooperating teeth.

If the writing pad unit is movable relative to the remainder of the apparatus, a scanning head of the static characteristic analysis means, when provided, may be mounted on the same traverse mechanism as the print head without mechanical conflict.

In some examples, there may be more than one analysis unit and/or more than one writing pad unit in use at the same establishment and thus preferably each writing pad unit is provided with coding means to ensure that each written sign is associated with the correct transaction. The coding means may take the form of coded interconnections between electrical contacts on the pad, the combination of interconnections being different for each pad.

In the case where the apparatus further includes a print head, an additional indicium or indicia may be printed on the docket as well as the other information to act as a code mark. Conveniently, such a code mark will not be easily imitated and may further be not easily visible. This mark would then be detected by the static characteristic analysis means and could be compared with the mark originally printed. This would ensure that the same docket was present at both stages of the transaction and one docket had not been fraudulently substituted for another.

An alternative way of ensuring that the same docket is used at both stages, would be to provide a locking device, such as a flap which clamps, and possibly additionally pierces the edge of, the docket to the writing pad unit when the docket is first placed on the unit. In this case, the analysis unit will further include means for detecting whether the locking device has been unlocked or otherwise tampered with in order to detect fraudulent use.

An example of signature verification apparatus in accordance with the present invention will now be described with reference to the accompanying drawings, in which:

FIG. 3 is a block circuit diagram of the printed circuit board of the unit;

FIG. 4 is a plan of the signature verification apparatus;

FIG. 5 is a side elevation of the apparatus shown in FIG. 4;

FIG. 6 is a block circuit diagram of the analysis unit shown in FIGS. 4 and 5;

Figure 1:
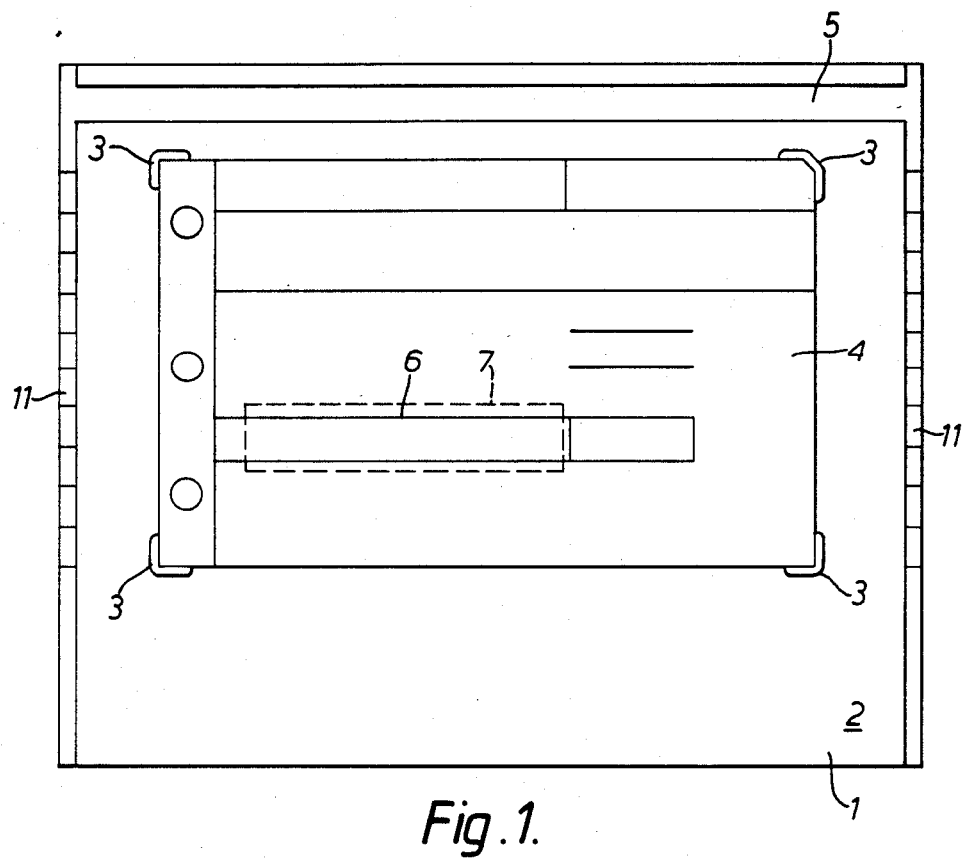
FIG. 1 is a plan view of a writing pad unit.
Figure 2:
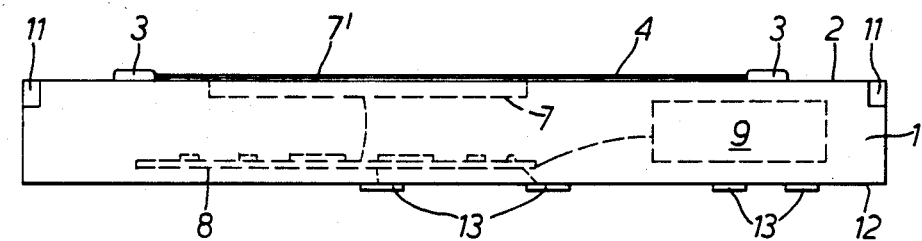
FIG. 2 is an end view of the unit shown in FIG. 1.

The apparatus shown in the drawings may be used at point of sale (POS) where verification of the identity of a signer is required before a credit card transaction is authorized or in debit card transactions such as EFT-/POS.

The apparatus comprises a self-contained portable writing pad unit 1 having an upper surface 2 carrying four corner guide elements 3 for locating a sales docket 4. The sales docket 4 is of conventional form as used in current credit card transactions. A groove 5 is provided in the upper surface 2 in which a pen or other writing instrument may be conveniently located. The area of the upper surface 2 of the writing pad unit 1 which is not normally covered by the sales docket 4 may carry promotional information or the like. A portion 6 of the sales docket 4 is provided within which the customer must write his signature. The guide elements 3 are so positioned that the portion 6 is always located above a pressure sensor 7 positioned within the unit 1.

In its simplest form the pressure sensor 7 comprises a conventional pressure pad which is electrically connected to a printed circuit board 8. An upper surface 7' of the sensor defines part of the surface 2. Examples of suitable pressure pads are disclosed in GB-A-1308548 and GB-A-1310683. Alternatively the sensor 7 may comprise an X-Y pad such as is disclosed in GB-A-1201424 and GB-A-1404460. In this specification the use of a pressure pad will be described.

The printed circuit board 8 includes a microprocessor 8A such as a Z80H which operates in accordance with a program stored in a program memory 8B. The microcomputer 8A is connected to the pressure sensor 7 via a pad interface 8C. A clock generator 8D is also connected to the microcomputer 8A. When a signature is written, the microcomputer 8A determines by reference to the clock 8B the times when contact is made or broken by a writing instrument on the pressure sensor 7. The microcomputer 8A determines from these times the total time for writing the signature, and the times for which the writing instrument is in contact and out of contact with the sales docket 4. This information is then stored in a data memory RAM 8E. The electronic components supported on the printed circuit board 8 are powered by a rechargeable battery 9 also located within the unit 1.

FIGS. 4 to 6 illustrate the writing pad unit 1 mounted within a slot (not shown) of an analysis unit 10. The unit 10 includes a drive motor (not shown) such as a stepper motor which actuates a pair of gear wheels 30 extending into the slot and positioned on either side of the writing pad unit 1 to engage respective series of teeth 11 formed in the sides of the unit 1. In use, the drive motor is actuated in a stepwise manner so that the gear wheels rotate to draw the writing pad unit 1 into the slot of the processing unit 10. An under surface 12 of the writing pad unit 1 carries a number of electrical contact strips 13 which make electrical contact with similarly positioned strips (not shown) in the slot of the analysis unit 10. This enables the battery 9 to be recharged when the pressure pad unit 1 is positioned in the processing unit 10 and also enables information stored by the RAM 8E on the printed circuit board 8 to be accessed via the microprocessor 8A and an interface 8F.

The analysis unit 10 includes a numeric key pad 14 and a function key pad 15 on its upper surface. An alphanumeric display 16 is also provided. A conventional SWIPE card reader 32 (FIG. 6) is positioned within the unit 10 and cooperates with a slot 17 for receiving the magnetic strip of the credit or other transaction card. The drawings indicate a communication line 18 which enables the analysis unit 10 to be connected to a remote data base via a modem (not shown).

FIG. 5 indicates schematically a print head, such as a daisywheel, and a scanning head to enable the written signature to be scanned combined in a single unit 19. The unit 19 is movable transversely to the direction of movement of the pad unit 1 in the slot (i.e. left to right and vice versa in FIG. 4).

In use, the writing pad unit 1 is prepared by positioning a fresh sales docket 4 on the surface 2 and presenting the unit 1 to the slot in the analysis unit 10, as shown in FIGS. 4 and 5. When a customer offers a credit card, the cashier draws the card through the slot 17 so that the magnetic strip on the card is read by the SWIPE card reader 32. Additionally the cashier enters the total amount of the transaction via the key pad 14, the total amount being displayed by the display 16. Control means, such as a microprocessor 31 and associated program memory 31A within the analysis unit 10 causes the customer details (read from the credit card), the establishment details (fixed in the internal memory 31A), and the charge total (entered from the key pad 14) to be printed on the sales docket 4 while the pad unit 1 is drawn in stepwise manner into the slot within the analysis unit 10. At each position of the pad unit 1 the print head moves from left to right (FIG. 4) and prints a portion of the information and then returns to its leftmost position while the pad unit 1 advances by a further step. Additionally, the customer's details are transmitted to a remote data base via the communication line 18. The unit 10 also notes the identity code of the particular writing pad 1 being used.

The cashier then withdraws the writing pad unit 1 and offers it to the customer who signs the docket 4 within the area 6 in the usual way. During the signing process, the electronics on the printed circuit board 8 records and stores suitable dynamic characteristic data such as the total time for writing the signature and the total time for which the writing instrument applies pressure to the contact surface 2.

After the signature has been written, the cashier replaces the writing pad unit 1 in the slot of the analysis unit 10 with the signed docket 4 still in place. By now, the analysis unit 10 will have received a reply from the data base comprising an authorization number which confirms the authorization, and reference static and dynamic characteristic signature data of the proper user of the card.

The drive motor within the analysis unit 10 is then activated to draw slowly the writing pad unit 1 step by step into the slot. At each step the scanning head in the unit 19 scans a line portion of the original signature. When the full signature has been scanned the microcomputer 31 determines the relevant static characteristic data. This may be any conventional data such as the length of the signature and/or number of vertical reversals. The previously stored dynamic characteristic data is read from the RAM 8E within the writing pad unit 1 and the microcomputer 31 additionally checks that the writing pad unit 1 is the one used for the current transaction. The microcomputer 31 in the analysis unit 10 then compares the reference data with the determined dynamic and static characteristic data. This comparison may be between the determined data and limits set by the reference data. See for example GB-A-2104698. If the comparison is successful, the authorisation number is printed on the sales docket 4 and the display 16 indicates that the transaction is authorised. If the analysis unit 10 is connected to or forms part of a cash register, the unit 10 may also signal to the cash register that the transaction is complete and may also transmit credit card company identification or other required information. Finally, the unit 10 indicates to the cashier that the transaction is complete.

The cashier now withdraws the writing pad unit 1, removes the sales docket 4 and fits a new sales docket and replaces the writing pad unit 1 in the unit 10.

In the event that the comparison is unsuccessful, the cashier may request a second signing on a new docket as described in more detail in our copending International Patent Application No.PCT/GB85/00009. Alternatively, the cashier may request other means of identification or contact the authorization center by telephone, the telephone being provided as part of the unit 10 or independently.

Figure 10:
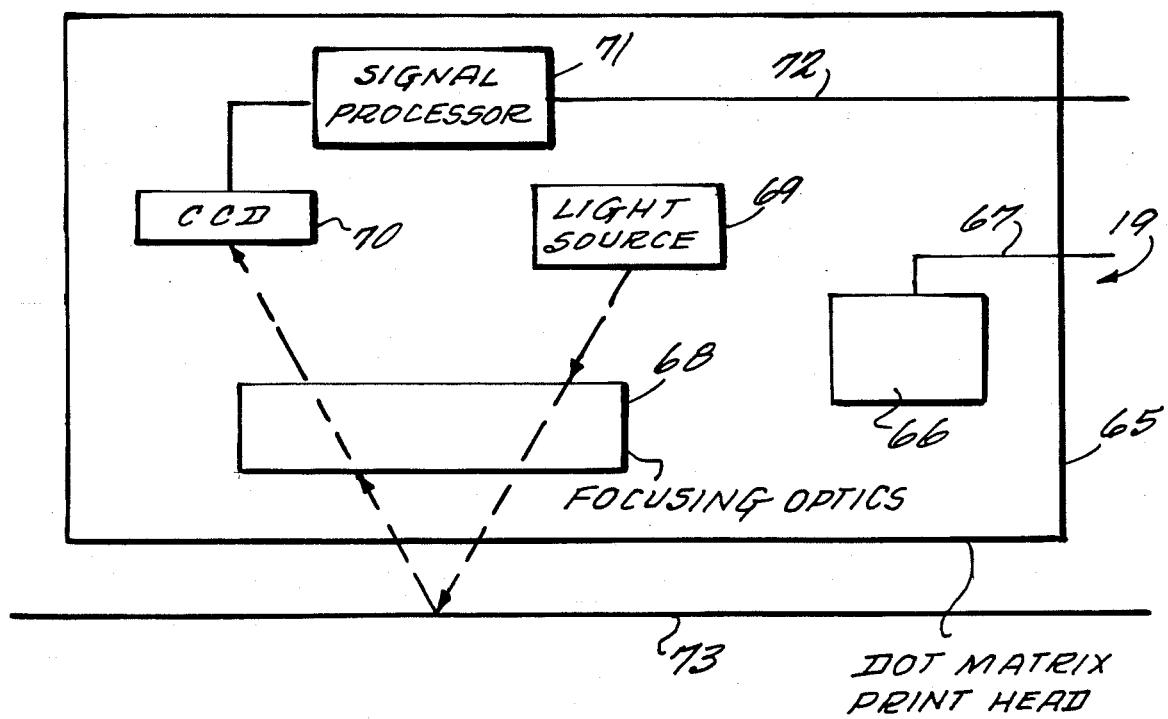

FIG. 10 illustrates one possible arrangement for a combined scanning and print head 19. A skilled person in the art would be able to easily construct such a suitable unit. In this example, the scanning head comprises a housing 65 within which are mounted a dot matrix print head 66 coupled via a line 67 with microcomputer 31. Focusing optics 68 and a light source such as a light emitting diode are also present. A CCD detector array is used along with signal processing circuitry 71 connected to the CCD array 70. Signal processing circuitry 71 is connected via a line 72 with a microcomputer. A docket carrying signatures is indicated at 73. All of the elements within housing 65 are movable together upon movement of the housing 65, to enable a signature on the docket 63 to be scanned as the docket is fed into analysis unit 10.

In a modified form of the apparatus, not shown, the reference static and dynamic characteristic data may be stored on the magnetic strip on the credit or other security card instead of being held at a remote authorisation centre. This enables the system to be used without connection to the authorisation centre for transactions within the limit allowed without authorisation (the so called floor limit).

In a still simpler version of the system (not shown), the printer mechanism can be omitted. In this version, the cashier completes the sales docket 4 manually in a conventional manner and then places it on the writing pad unit 1. The customer then signs the docket 4 and the unit 1 with the docket in position is placed in the analysis unit 10 as before. The cashier passes the credit card through the slot 17 and the SWIPE reader 32 reads the reference static and dynamic characteristic data from the magnetic strip on the card. The signature is scanned as before and dynamic data is collected from the RAM within the unit 1 and a comparison is carried out. An accept/reject decision is indicated to the cashier in accordance with the results of the comparison and, if desired, a fixed single character print head may print some confirmatory mark on the sales docket 4.

Figure 7:
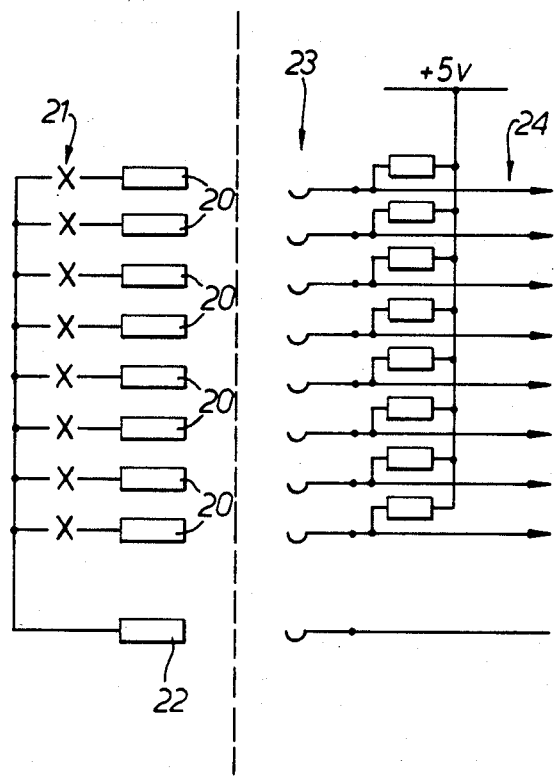
FIG. 7 is a schematic circuit diagram of a coding system for distinguishing between different pressure pad units.
Figure 8:
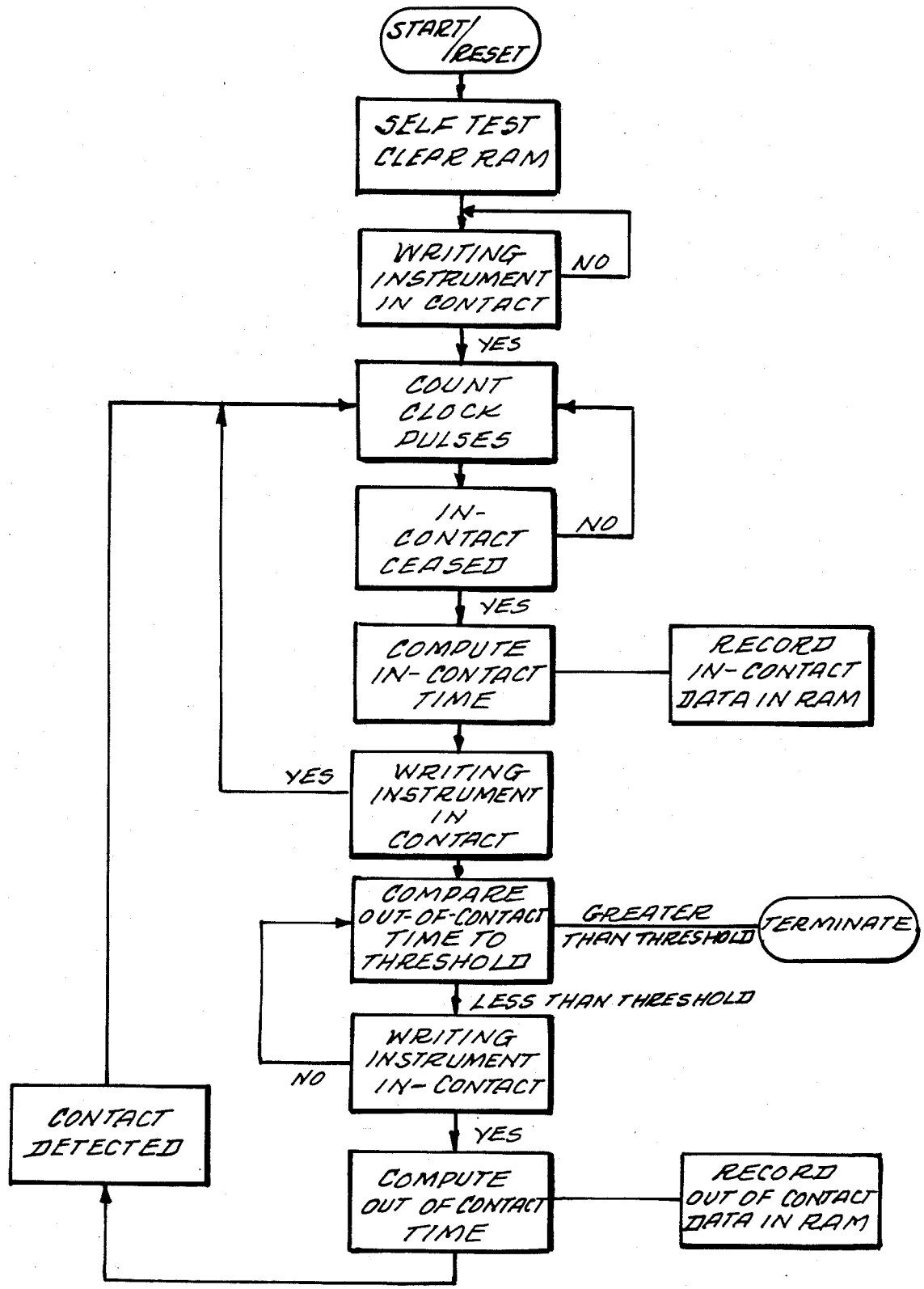
Figure 9:
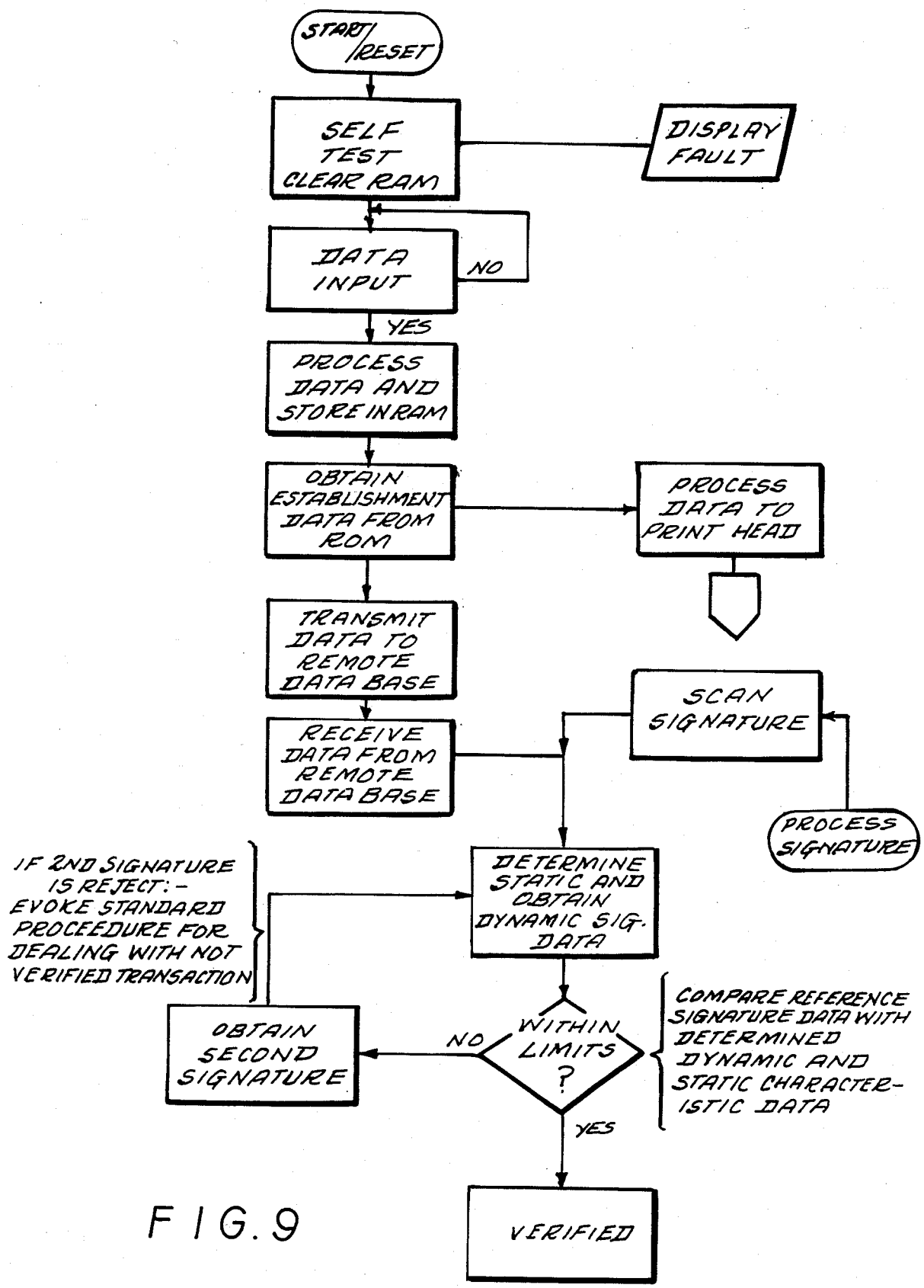

In many cases, more than one writing pad unit 1 will be usable with a single analysis unit 10. In order that the writing pad units 1 can be distinguished, each unit 1 is provided with a set of eight contact pads 20 connected via breakable links 21 to a contact pad 22 (FIG. 7). Each writing pad unit 1 can then be initially coded by selectively breaking one or more of the links 21 leading to a possible 256 different combinations. The analysis unit 10 is provided with nine complementary contact springs 23 which engage the contact pads 20, 22 when the writing pad unit 1 is positioned within the processing unit 10. A voltage of 5 volts is applied in parallel to the eight contact springs 23 corresponding to the contact pads 20 while the contact spring 23 corresponding with the contact pad 22 is grounded. When the contact springs 23 contact the contact pads 22 current will flow to ground through those links 21 which are not broken. This will cause "low" signals or lines 24. "High" signals will appear on the lines 24 corresponding to the broken links 21 and these signals on the lines 24 are fed to conventional decoding electronics which determines from the received signals which of the links 21 are broken and thus determines which writing pad unit 1 is being used.

We claim:

1. A self-contained portable, writing pad unit comprising:
   sensing means, including a contact surface, for sensing movement of a writing instrument over said contact surface when a user writes a sign in a location that can be detected by said contact surface and for generating corresponding electrical signals;
   electronic means for determining from said electrical signals data representing at least one dynamic characteristic feature of the written sign, said dynamic characteristic feature being one which is determinable only while said sign is being written and is characteristic of the manner that the user writes the sign, said electronic means including storage means for storing said data; and
   a power supply for enabling operation of the electronic means,
   wherein said writing pad unit is configured for portability such that said unit can be carried to said user at a point of sale.

2. A unit according to claim 1, wherein said power supply is rechargable.

3. A writing pad unit according to claim 1 wherein said dynamic characteristic feature is a feature from the group consisting of time of writing the complete sign, times which the writing instrument is in contact with the contact surface and the time for which the writing instrument is out of contact with the contact surface, locatin of the writing instrument, and degree of pressure.

4. A signature verification apparatus comprising:
   a self-contained portable writing pad unit including:
   (a) sensing means having a contact surface for sensing movement of a writing instrument over said contact surface when a user signs in a location that can be sensed by said contact surface and for generating corresponding electrical signals;
   (b) electronic means for determining from said electrical signals data representing at least one dynamic characteristic feature of the written signature, said at least one dynamic characteristic features being features which are determinable only while said signature is being written and are characteristic of the manner that the user writes the sign;
   (c) storage means for storing said data; and
   (d) a power supply for enabling operation of the electronic means; and
   an analysis unit separable from, but connectable to said writing pad unit, including: a) means for comparing said at least one dynamic characteristic feature stored by said storage means of said writing pad unit with corresponding reference data and for indicating verification if the compared characteristic features are substantially the same, and b) static characteristic analysis means for determining, when the writing pad unit is connected to said analysis unit, at least one static characteristic feature of the sign written on said writing pad unit, said comparison means being adapted to compare said at least static characteristic feature with corresponding reference data, wherein said writing pad unit is configured for portability so that it can be carried to a user at a point of sale.

5. Sign verification apparatus according to claim 4, further comprising electrical connection means for connecting said writing pad unit with said analysis unit.

6. Sign verification apparatus according to claim 4, further including a magnetic strip (SWIPE) reader for reading said reference data stored on a security card.

7. Sign verification apparatus according to claim 4, further comprising means for connecting said analysis unit to a remote data base containing said reference data.

8. Sign verification apparatus according to claim 4, wherein said analysis unit further includes a print head which can imprint transaction data on part of a docket supported on said writing pad unit.

9. Sign verification apparatus according to claim 8, wherein said writing pad unit is movable in stepwise fashion relative to the rest of the sign verification apparatus while said print head is movable in a direction transverse to the direction of movement of said pad unit.

10. Sign verification apparatus according to claim 4, further including drive means adapted to cause movement of means defining a drive surface cooperating with one or more portions of said writing pad unit to cause said writing pad unit to move relatively to the remainder of the apparatus.

11. Sign verification apparatus according to claim 4, further comprising a plurality of writing pad units each of which may be associated with said analysis unit, each said writing pad unit being provided with coding means to ensure that each written sign is associated with the correct transaction.

12. Sign verification apparatus according to claim 4, wherein said power supply is rechargeable.

13. A self contained, portable writing pad unit for use at a plurality of different points of sale, comprising:

sensing means, including a contact surface, for sensing movement of a writing instrument over said contact surface and generating electrical signals indicative thereof;

electronic means for determining from said electrical signals at least one dymamic characteristic feature of the written sign, said dynamic characteristic feature being a feature characteristic of the manner that the user writes the sign, and of a type which is determinable only while the sign is being written, and being a characteristic from the group consisting of time of writing the complete sign, times for which the writing instrument is in contact with the writing surface and time for which the writing instrument is out of contact with the writing surface out of contact with the contact surface, location of the writing instrument, and degree of pressure; and a power supply for enabling operation of the electronic means, wherein said writing pad unit is separable and configured for portability such that said unit can be carried to said user at one of said points of sale.

* * * * *